June 12, 1951  L. B. LIPSON ET AL  2,556,201
PULSE-ECHO DIRECTION AND RANGING DEVICE
Filed Jan. 15, 1944  4 Sheets-Sheet 1

Inventors
LEONARD B. LIPSON
ALFRED W. PETCHAFT
By William D. Hall
Attorney

June 12, 1951  L. B. LIPSON ET AL  2,556,201
PULSE-ECHO DIRECTION AND RANGING DEVICE
Filed Jan. 15, 1944  4 Sheets-Sheet 4

INVENTORS
LEONARD B. LIPSON
ALFRED W. PETCHAFT
by Harry M. Saragovitz
Attorney

Patented June 12, 1951

2,556,201

UNITED STATES PATENT OFFICE 2,556,201

PULSE-ECHO DIRECTION AND RANGING DEVICE

Leonard B. Lipson and Alfred W. Petchaft, Arlington, Va., assignors to The Geotronics Corporation, Dallas, Tex., a corporation of Virginia Application January 15, 1944, Serial No. 518,374

7 Claims. (Cl. 343—11)

(Granted under the act of March 3, 1883, as amended April 30, 1928; 370 O. G. 757)

The invention described herein may be manufactured and used by or for the Government for governmental purposes, without the payment of any royalty thereon.

This invention relates in general to certain new and useful improvements in clearance and direction indicating devices and more particularly to an instrument adapted for use in connection with vessels, aircraft and the like, to detect the unseen presence of obstacles hazardous to night travel and to travel in bad weather or adverse atmospheric conditions.

It is well recognized that the navigation of vessels and aircraft at night and under adverse weather conditions is perilous by reason of the danger of collision. Many transportation tragedies have occurred as a result of collisions between ships and icebergs for instance or between aircraft and mountain peaks. Particularly in the field of aeronautics these dangers are certain to become more frequent as air travel by civilians and unskilled navigators increases. In fact, the development of aviation as a mode of private travel for the average person will make necessary the provision of simple and substantially automatic instruments enabling the civilian to fly safely and accurately without extensive, highly technical training in the science of navigation. Furthermore, if mass production and wide-spread sale of low cost aeroplanes and helicopters is to be achieved, equipment of the type here under discussion must be relatively cheap, light-weight, rugged and capable of being readily maintained or repaired.

It is, therefore, a primary object of the present invention to provide instruments of the type stated which will be capable of installation in low-priced aircraft such as helicopters for example, and can be readily operated or used by the average civilian without extensive technical education.

It is a further object of the present invention to provide a clearance and direction indicating device which is capable of producing an easily interpretable visual signal or warning of an obstacle as well as showing the direction and distance of the obstacle in relation to the ship, craft or vehicle in which the device is installed.

It is a further object of the present invention to provide a device of the type stated which can be pre-set to indicate the proximity of obstacles within a specific range or radius and may be simply and quickly converted to operate for various ranges depending upon flying conditions and related circumstances so that, for example, the device may be used at one range for normal flying and at a different range for take-offs and landings.

It is a further object of the present invention to provide a device of the type stated which is sturdy, compact and relatively inexpensive, which may be readily serviced or repaired and which will automatically reveal whether or not it is operating properly so that the user will know at once if the instrument is out of adjustment or otherwise in such disrepair as to be unreliable.

In the drawings (3 sheets):

Figure 1:
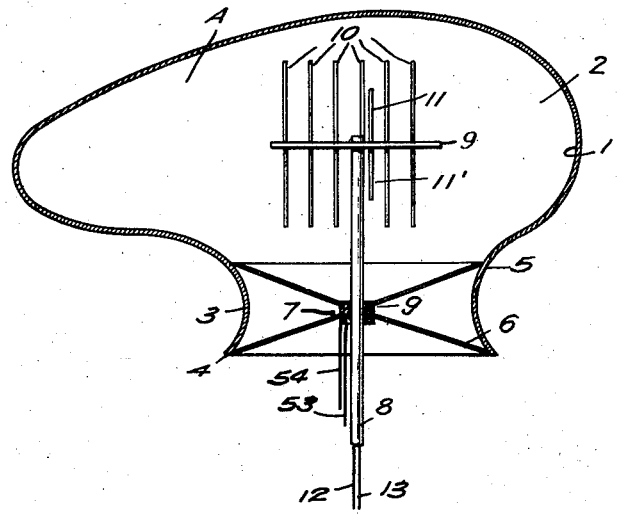
Fig. 1 is a vertical sectional view of the antenna assembly forming a part of our present invention.

Before attempting a detailed description of a preferred embodiment of our invention, it will probably be desirable to set forth in broad and general outline the component elements and the principles of operation involved. To this end it may be stated that we have provided a suitable transmitting radiator, adapted to emit frequency controlled and timed impulses in all radial directions within a relatively thin layer or plane perpendicular to its axis of symmetry. If the impulses strike against a solid body, they will be reflected in such a manner that a reflected impulse or impulse-echo, as it may be called, will return along a line corresponding to the azimuth or direction between the radiator and obstacle. Inasmuch as the impulses travel at the speed of light, no measurable or significant error will be introduced by relative motion between the obstacle and the plane, helicopter or other transportation device upon which the radiator may be mounted. Disposed preferably in concentric relation to the radiator is a rapidly revolving, highly directional antenna adapted to pick up the impulse-echo only for a short instant once during each revolution, that is to say, when the line of directional receptivity of the antenna is aligned with the path of the incoming impulse-echo. The rotating antenna and radiator are uniquely connected through the various electronic circuits, presently described, to a cathode ray tube having a beam which sweeps circular and horizontal paths in rapidly alternating succession so that the screen of the tube presents the appearance of having a circular and horizontal line at all times. During each interval in which the beam is sweeping the circular path, it is synchronized in rotational speed with the rotational speed of the antenna. Furthermore, the antenna is so connected to the tube that whenever the antenna picks up an impulse-echo a corresponding deflection, defocused spot or other visible indication will appear along the circular trace and since the trace and antenna are in a sense "rotating together," this spot or other indication will appear at a point along the circular trace which corresponds to the angular position of the antenna at the moment the signal is picked up. In addition the antenna and radiator are both connected to the tube in such a manner that the outgoing impulse and the impulse-echo will both produce spaced deflections along the horizontal trace such that the distance between them is a measure of the distance between the obstacle and the radiator.

Referring now in more detail to the drawings A designates the antenna radiator assembly forming a part of our invention and comprises an outer housing 1 constructed preferably of synthetic plastic or any other structurally strong radiation-transparent material. It is desirable, although not absolutely essential, that the housing 1 be formed in the streamlined shape shown, having a somewhat ellipsoidal shell 2 integrally connected on its underface to a neck 3 of circular cross-section and having a flaring skirt-like lower portion 4 for securement in any conventional manner to the roof or any other suitable point of attachment on the aeroplane, helicopter or vehicle (not shown). It should be noted in this connection, however, that the antenna assembly A should preferably be so located that none of the stationary structure or moving parts of the aeroplane, helicopter or vehicle will be in the path of the emitted impulses.

Peripherally secured within the housing neck 3 are two identical and opposed frusto-conical metal members 5, 6 axially spaced from each other at their apices in the provision of a narrow gap g, and symmetrically disposed with the gap g is a small vertical exciter antenna 7, forming, together with the members 5, 6, a so-called biconical horn type radiator. Extending axially through the members 5, 6 and upwardly into the shell 2 is a hollow Bakelite shaft 8 provided at its upper end with a rigidly secured triangular plate 9 formed of polystyrene or other suitable material, the latter being so positioned that its center of gravity is coincident with the axis of rotation of the shaft 8. Along two of its lateral edges, the triangular plate 9 is provided with a plurality of equally spaced copper rods 10 extending through, and projecting equidistantly, on either side thereoff. Also mounted in and projecting on either side of the plate 9 are axially aligned copper rods 11, 11' forming the two elements of a dipole receiving antenna, respectively connected to a coaxial cable having an inner conductor 12 and an outer conducting sheath 13 and extending through the interior of the hollow Bakelite shaft 8. Various means such as slip rings or goniometers may be employed at this point for electrically connecting the antenna to the remainder of the apparatus, but we have found preferable and, hence, have shown the conductor 12 and sheath 13 as being connected across a coil 14 which is in turn fixed to the shaft 8 and is inductively coupled to a fixed coil 15, within which it rotates. Adjustably secured to the shaft for rotation therewith is a fiber disk 16 which is provided adjacent its peripheral margin with a magnetized high permeability insert 17. Suitably mounted adjacent to the disk 16 is a solenoid 18 so arranged that the lines of flux associated with its windings will be changed sharply each time the insert 17 of the rotating disk 16 passes it.

At its lower end the shaft 8 is connected through a conventional gear box 19 to an antenna motor 20 which is in turn connected thru a suitable motor speed control 21 to any suitable source of electric power. It will, of course, be apparent that the length and arrangement of the shaft 8 should be such as to permit convenient location of the coil 14, 15, the disk 16 and the motor 20 within the interior of the aeroplane, helicopter or vehicle.

Figure 2:
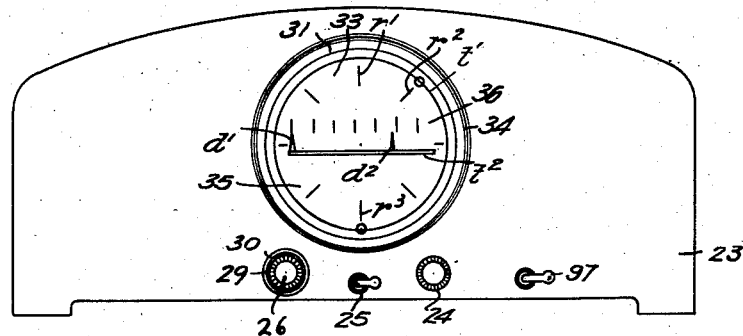
Fig. 2 is a front elevational view of an instrument panel or dashboard having the visual indicator and controls forming a part of our present invention.

The motor control 21 is mounted upon a dashboard or instrument panel 23 and the control knob 24 located accessibly upon the face thereof for convenient manipulation by the operator. Also mounted upon the panel 23 is a main switch 25 of any conventional design and a focusing and intensity control 26 preferably consisting of two concentrically mounted variable resistors 27, 28 having aligned control knobs 29, 30 respectively. The panel 23 is also provided with a circular opening 31 and secured behind the panel is a cathode ray tube 32 having its forward or screen-containing end 33 presented through the panel opening 31 and held therein by means of an annular shock-absorbing ring 34. Etched or otherwise marked upon the outer face of the tube 32 are a circular scale 35 graduated in degrees for indicating relative azimuth and a horizontal scale 36 graduated in feet or yards for indicating lineal distance, all as best seen in Fig. 2.

The cathode ray tube 32 is also internally provided in conventional manner with four counterposed deflection plates 37, 38, 39, 40, an accelerating anode 41, a focusing anode 42, a grid or modulating electrode 43 and a cathode or filament 44.

Figure 3:
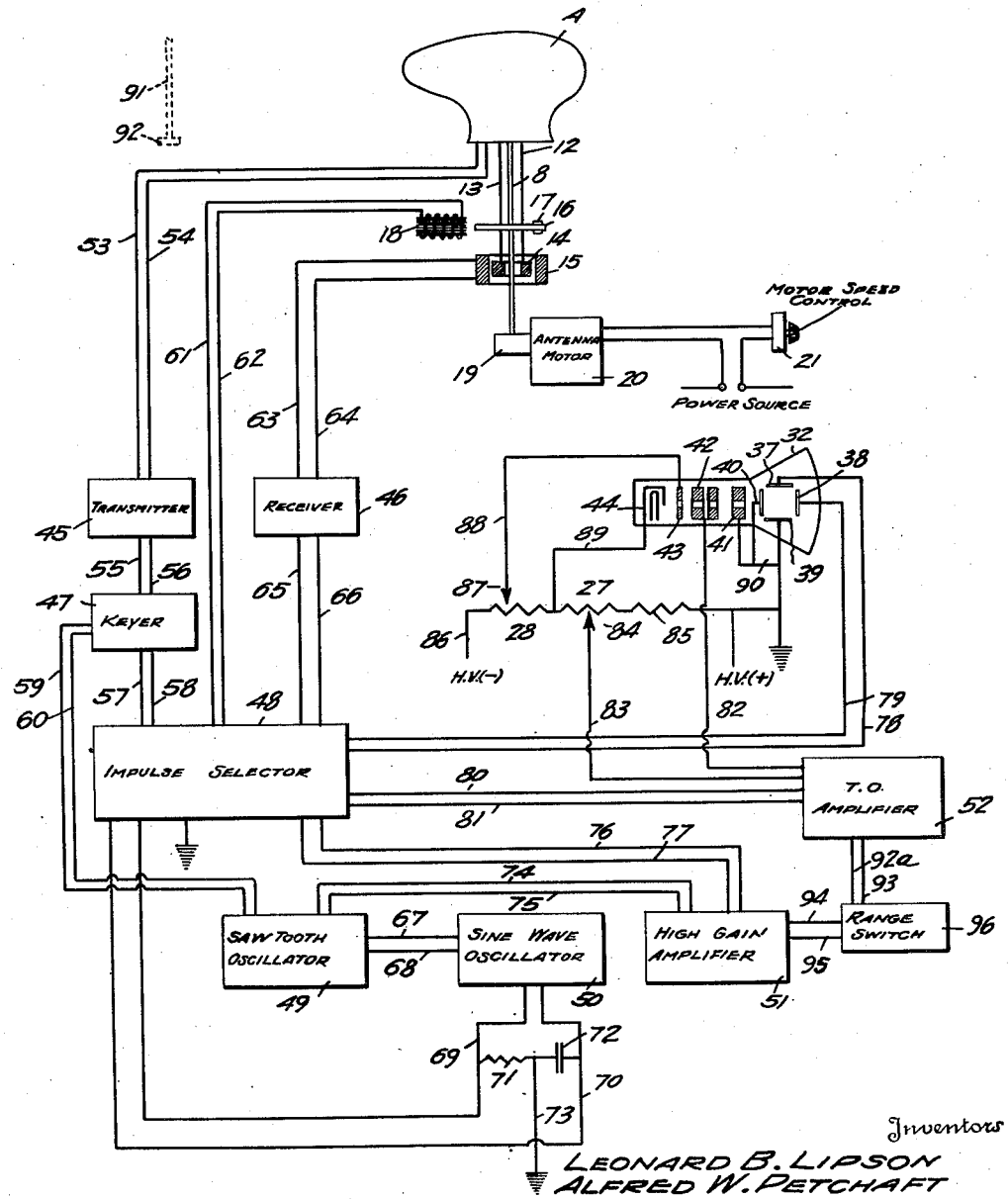
Fig. 3 is a schematic view of a preferred form of clearance and direction indicator constructed in accordance with and embodying our present invention.
Figure 5:
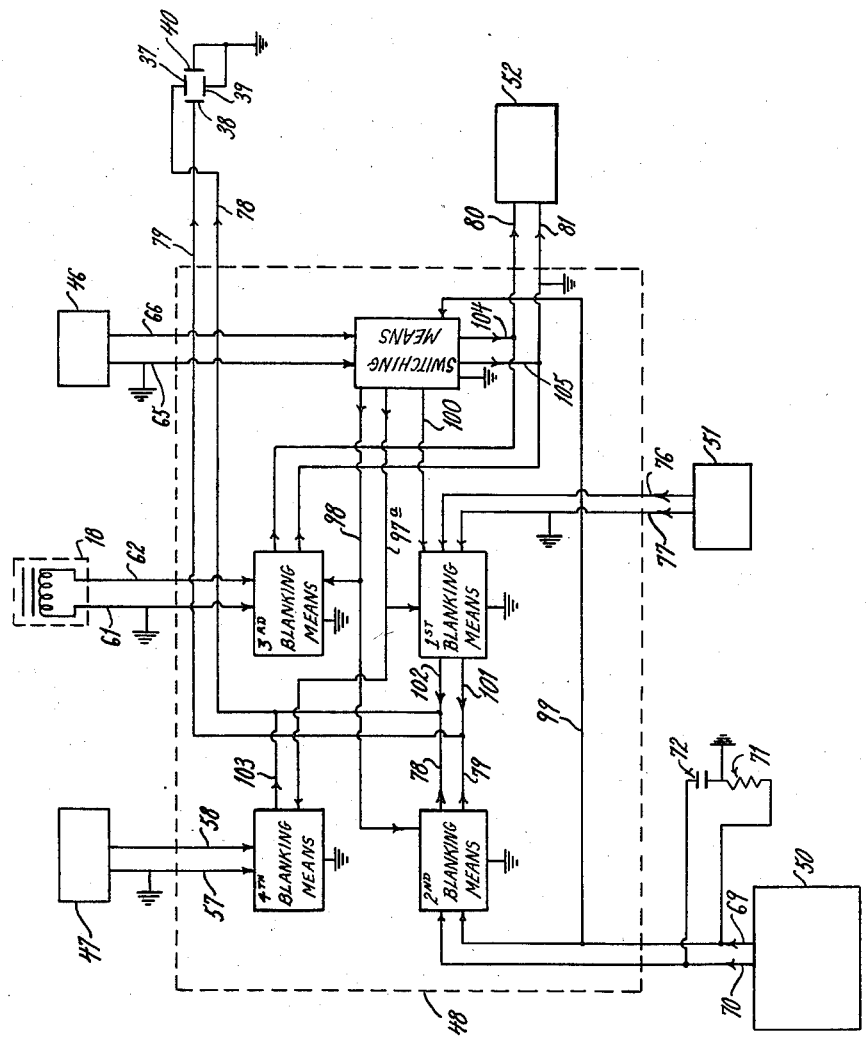
Fig. 5 is a schematic wiring diagram of the impulse selector forming a part of the present invention.

The antenna-radiator assembly A is electrically connected to the cathode ray tube 32 through a series of inter-connected and cooperative circuits as schematically shown in Fig. 3, and comprising a transmitter 45, a receiver 46, a keyer 47, an impulse selector 48, a saw-tooth oscillator 49, a sine-wave oscillator 50, a high-gain amplifier 51 and a transformer-output amplifier 52. It may be pointed out in this connection that the impulse selector 48 includes four synchronized blanking means. Any conventional blanking circuit may be employed, the simplest and most commonly recognized form of which comprises essentially a vacuum tube amplifier which is converted so that it may be alternately rendered conducting or non-conducting by means of a square wave generator which controls the bias of said amplifier. The first blanking means is for receiving the output of the saw-tooth oscillator 49, the second blanking means is for receiving the output of the sine-wave oscillator 50, the third blanking means is for receiving the impulse created when the magnetized high permeability insert 15 induces a current in solenoid 18, and the fourth blanking means is for receiving the attenuated output of the keyer 47. In addition, the impulse selector 48 includes a switching circuit for alternately imposing the output of the receiver 46 upon the first blanking means and upon the input of the amplifier 52. The operation of the impulse selector 48 may best be seen by reference to Figure 5. The input and output leads of the four blanking means are indicated by arrows going into and coming out of the boxes representing the various means. It should be noted that one input lead and one output lead of each of the means in the impulse selector 48 is grounded. The first blanking is provided with two channels. The input to channel 1 is through leads 76 and 77 (ground); the input to channel 2 is through lead 100 and ground. The output from channel 1 is through lead 101 and ground. The output from channel 2 is through lead 102 and ground. The two channels of the first blanking means operate so as to pass on to leads 78 and 79, or blank out, the output of 51 and 46. The output of 46 passes through the switching means before it is impressed, by means of lead 100 and ground, on the first blanking means. Lead 97a and ground is provided so that a square wave pulse in the proper phase is provided to the first and fourth blanking means. Thus when the output of 46 is impressed on the first blanking means, the proper pulse is provided to the first and fourth blanking means so that they are conducting. The fourth blanking means, by means of input leads 57 (ground) and 58 and output lead 103 and ground provides a reference pip $d^1$ on the trace $t^2$ from the keyer 47. The second blanking means has two channels. The input to channel 1 is lead 69 and ground. The input from channel 2 is lead 70 and ground. The output from channel is lead 78 and ground. The output from channel 2 is lead 79 and ground. Lead 98 and ground provides a square wave pulse in the opposite phase from that provided by 97a and ground for the proper operation of the second and third blanking means. The second blanking means by means of input leads 69 and 70 and phase shifting network 71 and 72 through output leads 78, 79, and ground provides the circular trace $t^1$. During this same interval, the third blanking means, through output leads 80 and 81 (ground), is providing reference pip $r^3$ from 18. Also during this same interval, the switching means has switched the output of receiver 46 to output lead 104 and 105 which connect to leads 80 and 81, respectively. Lead 99 and ground is used to synchronize the square wave generator in the switching means with oscillator 50.

The exciter antenna 7 is connected by a coaxial cable having an inner conductor 53 and concentric conducting sheath 54 to the output circuit of the transmitter 45, the input circuit of which is in turn connected by leads 55, 56 to the output circuit of the keyer 47. The attenuated output of the keyer 47 is connected by leads 57, 58 to the fourth blanking means, and the input circuit of the keyer 47 is connected by leads 59, 60 to selected output points within the saw-tooth oscillator 49 for imposing a synchronizing voltage upon the keyer 47. The solenoid 18 is connected, as above stated, to the third blanking means of the impulse selector 48 by leads 61, 62 and similarly the coil 15 is connected by coaxial leads 63, 64 to the input circuit of the receiver 46 which is in turn connected on its output side by leads 65, 66 to the switching circuit of the impulse selector 48.

The saw-tooth oscillator 49 and sine-wave oscillator 50 are interconnected for synchronization by leads 67, 68, and the sine-wave oscillator 50 is itself connected through leads 69, 70 directly to the second blanking means of the impulse selector 48, the leads 69, 70 being bridged by a phase shifting network consisting of a fixed resistor 71 connected in series with a fixed capacitor 72. A lead 73 is taken off between the resistance 71 and condenser 72 for connection to ground. Similarly the saw-tooth oscillator 49 is connected by leads 74, 75 to the high-gain amplifier 51, which is in turn connected by the leads 76, 77 to the first blanking means of the impulse selector 48.

The output from the first, second and fourth blanking means of the impulse selector 48, as will presently more fully appear, is imposed through the leads 78, 79 respectively upon the deflection plates 37, 38 of the cathode ray tube 32. Further the output of the third blanking means and one output phase of the switching circuit are connected in common by leads 80, 81 to the input circuit of amplifier 52.

The output circuit of amplifier 52 is connected by leads 82, 83 respectively to the focusing anode 42 and a sliding contact 84 of the variable resistor 27, the latter being connected at one end to the variable resistor 28 and at its other end to one end of a fixed resistor 85 which is in turn connected at its other end to ground. The resistor 28 is connected at its other end by lead 86 to the negative terminal of a high voltage power source, the positive terminal of which is connected to ground. The sliding contact 87 of the resistor 28 is connected by lead 88 to the grid or modulating electrode 43 and finally a cathode lead 89 is taken off between the connected ends of the resistors 27, 28 and connected to the cathode 44. The plates 39, 40 and the accelerating anode 41 are mutually connected internally and connected by a common lead 90 to ground.

The keyer 47 which, as has been above pointed out, is synchronized with the saw-tooth oscillator 49, is designed to emit a pulse of short duration at the beginning of each saw-tooth oscillation and this pulse is fed simultaneously into the transmitter 45 and the fourth blanking means of the impulse selector 48. Thus the transmitter operating through the coaxial leads 53, 54, the exciter antenna 7, and the horn-radiators 5, 6, will emit a short impulse at timed intervals.

Figure 4:
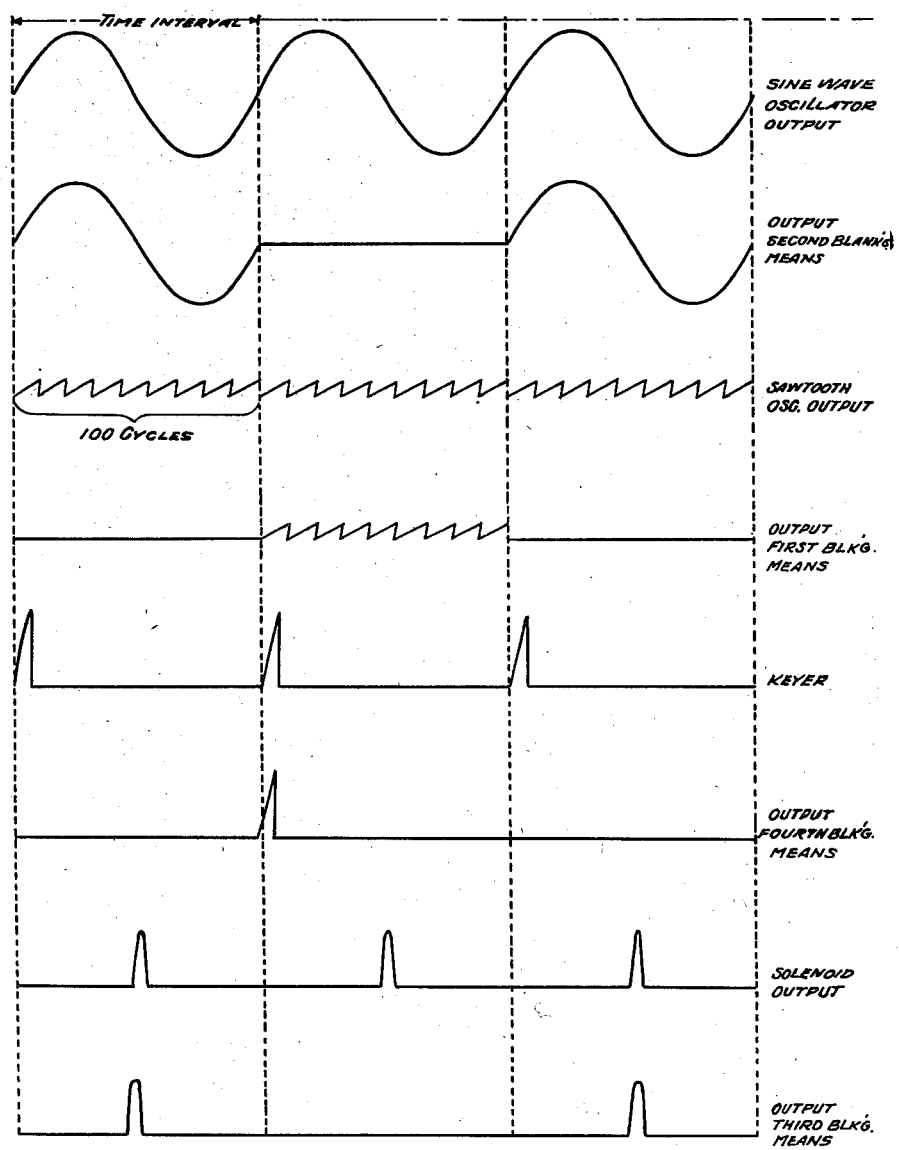
Fig. 4 is a graphic representation of the timed relation between the various electrical impulses and wave-forms employed in the operation of the clearance and direction indicator.

The timed correlation of the outputs of the oscillators and the four blanking means is shown graphically in Fig. 4. It should be clearly understood that the four blanking means cooperate, within the impulse selector 48, so that during a given time interval either the sine-wave or saw-tooth wave will be imposed upon the cathode ray tube 32. Furthermore, one output of the first blanking means is connected, within the impulse selector 48, to ground and to lead 79 so that the saw-tooth oscillator, during the intervals of its transmission, will be imposed across deflection plates 38, 40. Similarly, the outputs of the second blanking means is connected, within the impulse selector 48, to leads 78, 79 and to ground so that the sine-wave oscillation, during the intervals of its transmission, will be imposed across all four deflection plates 37, 38, 39, 40.

Inasmuch as the sine-wave oscillator is associated with the phase-shifting network consisting of resistor 71 and capacitor 72, the phase shifted sine-wave outputs of the second blanking means when fed to the cathode ray tube 32, will act as a circular sweep; likewise, the saw-tooth output of the first blanking means will act as horizontal sweep. Consequently the beam will produce, on the sentitized screen, a circular trace $t^1$ followed by a horizontal trace $t^2$ as indicated in Fig. 2.

From Fig. 3 and the foregoing description it will be evident that the keyer 47, the impulse selector 48 and the saw-tooth oscillator 49 are all synchronized by the sine-wave oscillator 50 so that the several wave forms depicted in Fig. 4 will be maintained in strict timed relation. It is also essential that the antenna motor 20 and the gear box 19 be selected and designed to rotate the antenna shaft 8 and its associated parts at a speed which bears a fixed and calculated relationship to the frequency of the sine-wave oscillator 50. For illustrative purposes in the present description it may be assumed that antenna shaft 8 is rotating at a speed of 720 revolutions per minute and the sine-wave oscillator 50 has a frequency of twelve cycles per second so that the circular sweep is in effect rotating at the same speed as the antenna shaft 8. At the same time the saw-tooth oscillator 49 is oscillating at 1200 cycles per second or 100 cycles for each cycle of the sine-wave oscillator 50 and the keyer 47 which is in effect energized by the saw-tooth oscillator 49 will emit 1200 pulses per second. The speed of the circular trace $t^1$ is relatively slow in relation to the persistence of vision of the human eye, hence, it is desirable that the screen 33 of the cathode ray tube 32 be a fairly long persistence screen so as to prevent flickerings or visually perceptible discontinuity of the image.

In operation, the main switch 25 is turned on energizing the entire apparatus and setting the antenna assembly in motion. The transmitter 45, under control of the keyer 47 sends out short timed pulses in timed relation to the frequency of the sine-wave oscillator 50 as previously described and illustrated in Fig. 4. These impulses are emitted radially in all directions in a plane perpendicular to the axis of symmetry of the biconical horn radiators 5, 6. For most purposes, such as use in helicopters for example, this axis of symmetry will always be substantially vertical to the ground and, therefore, the radiations emitted by the biconical horns 5, 6 will travel in a substantially horizontal plane and the angle of divergency between the members 5, 6, should be such that the distance between the upper and lower limits of the radiation at the outer limit or range of the apparatus should be sufficiently greater than the vertical height of the helicopter itself as as to provide an adequate margin of safety above and below. If this angle of divergence is too narrow, the emitted radiations may miss a mountain peak which is only a few feet below the line of flight of the helicopter and on the other hand if the angle of divergence is too great the emitted radiations may detect a mountain peak which is far below the line of flight of the helicopter, either result being obviously impractical and undesirable. From this it will be seen that the angle of divergence should be selected with reference to the flying speed of the helicopter and the range of the apparatus itself so as to achieve a practical result allowing an adequate but not excessive margin of safety above and below the line of flight of the helicopter.

When the timed pulses emitted by the biconical horn radiator encounter an obstacle, a return or impulse-echo will be reflected back to the rotating dipole antenna 11, 11$^1$ along a line corresponding to the azimuth or line of direction between the antenna and the obstacle. By reason of the fact that the dipole antenna 11, 11$^1$ is placed within the angle of a so-called "corner" reflector, comprising plate 9 and rods 10, it will only pick up the signal during the instant in which its axis of reception or directivity is aligned with the azimuth or line of direction of such incoming signal or impulse-echo. This impulse-echo will be transmitted through the inductively coupled coils 14, 15 to the receiver 46.

From the receiver 46, the impulses are transmitted through the leads 65, 66 to the switching means within the impulse selector 48 and by the switching means alternately transmitted to the transformer output amplifier 52 and the first blanking means of the impulse selector 48.

Meanwhile the impulses from the keyer 47 are also transmitted to the fourth blanking means and super-imposed upon the saw-tooth wave at the very beginning of each cycle. Therefore, during a selected interval in which the saw-tooth wave is being transmitted (the sine-wave being blanked out during this interval) the horizontal trace $t^2$ will appear on the screen of the cathode ray tube 32 and a visable deflection or pip $d'$ will appear at the left-hand end of the trace $t^2$ providing a point of reference for the measurement of lineal distance. Inasmuch as the saw-tooth wave has a frequency of 1200 cycles, the time interval for each cycle is approximately 833 microseconds and assuming that the equipment be designed for a range of two miles, the impulse-echo, if returning from maximum range, will consume about 20 microseconds. For this reason the high gain amplifier 51 is so adjusted as to stretch the theoretical length of the horizontal trace to about 80 inches so that the first two inches (which will be within the size limitations of the screen 33 and therefore visible) will be traced out in about 20 microseconds. If the keyer controlled impulse sent out by the transmitter 45 encounters an obstacle so that an impulse-echo returns, such impulse-echo will be picked up by the rotating dipole antenna 11 and impressed through the switching means of the impulse selector 48 upon the saw-tooth wave resulting in a second visible deflection or pip $d^2$ in the horizontal trace $t^2$. Since the emitted impulse and its corresponding impulse-echo travel at a finite speed there will be a definite time lag between the emission of the impulse and its return which is directly proportional to the lineal distance between the obstacle and the antenna 11. Because of this time lag, the impulse-echo coming through the receiver 46 will be impressed upon the saw-tooth wave at some finite interval of time after the beginning of its cycle. Consequently, the pip $d^2$ will be displaced to the right of the zero or reference pip $d'$ by a distance which is a direct measure of the lineal distance between the obstacle and the antenna 11. By providing a suitably calibrated scale 36 on the face of cathode ray tube 32 it thus becomes possible to read this lineal distance directly in terms of feet, yards, miles or any other selected unit of measurement.

In the next succeeding interval the saw-tooth wave and its super-imposed pip forming impulses will be blanked out and the sine-wave will be transmitted through the second blanking means of the impulse selector 48 to produce the circular trace $t'$ on the screen of the cathode ray tube 32. Of course the intermittent impulses sent out by the transmitter 45 under timed control of the keyer 47 will continue in unbroken sequence. Since the keyer 47 emits 100 pulses for each cycle of the sine-wave oscillator, this means that 100 pulses will be sent out during each revolution of the antenna 11 or in effect 1 pulse for each 3.6° of arcuate movement. The antenna 11 would therefore be designed to have an accuracy or definitive selectivity of approximately ±2° so that it will pick up any impulse-echo within an arc of slightly more than 4°. Consequently, the antenna during each revolution will pick up at least one of the impulse-echoes returning from a given obstacle, no matter what the azimuth or direction line to that object may be. Of course, the direction indication will only be accurate within 2° but for navigational purposes in a helicopter or similar craft, this accuracy is more than adequate. It will, of course, be understood that where higher accuracy is desired a higher frequency repetition rate may be employed in the saw-tooth oscillator 49 and keyer 47 respectively together with an antenna of much sharper or definitive selectivity. Thus, when the antenna 11 reaches the position in which its axis is in line with the azimuth of the impulse-echo an impulse will be transmitted through the receiver to the switching means of the impulse selector 48 which, during this interval, is functioning to transmit the impulse to the transformer output amplifier 52 and such impulse is thus impressed upon the focusing anode 42 in series with the potential normally derived through the contact arm 84 of the variable resistance 27, thereby defocusing the cathode beam so as to create a distinct dot or bright spot. Since the trace $t^1$ and the antenna 11 are "rotating together" the spot will appear at some point on the circular trace $t^1$ which corresponds to the azimuth of the obstacle. For instance, if the cathode ray tube is graduated circularly so that the graduation $r^1$ will correspond to a "dead ahead" position, then an obstacle which is 45° off to the right of the line of travel of the helicopter will be indicated by a spot on the trace $t^1$ 45° down to the right of the graduation $r^1$ as shown at $r^2$ in Fig. 2.

Because the antenna motor 20, in the ordinary course of manufactured articles, cannot be made to operate at a precisely constant speed without resort to very expensive automatic speed control devices, it is desirable to provide a simple visual signal or indexing means to show when the motor and the circular sweep are properly synchronized. Such a signal can be employed in conjunction with a suitable rheostat or other manual motor speed control 21. Accordingly, we provide the adjustable fiber disk 16 which is fixed to the rotating shaft 8 and carries the magnetic insert 17. As the shaft 8 rotates, the magnetic field of the insert 17 cuts the lines of flux associated with the conductors making up the solenoid 18 and induces a current in the coils thereof so that a very short impulse is fed through the leads 61, 62, into the third blanking means of the impulse selector 48 and thence imposed upon the focusing anode 42 during each so-called "sine-wave" interval. The disk 16 is preferably set upon the shaft 8 so that the insert 17 is directly to the rear when the antenna is in "dead ahead" position, thus a visible deflection or indexing pip will appear continuously on the circular trace and, so long as the shaft 8 and the circular sweep $t^1$ are traveling at the same speed, this indexing pip will be coincident with the graduation $r^3$. If the antenna begins to rotate either slower or faster than the circular sweep, the indexing pip will creep to the right or the left of the graduation $r^3$ as the case may be, whereupon the operator can turn the motor speed control knob 24 and increase or decrease the speed of the motor 20 until the pip returns and remains at the proper position of coincidence with graduation $r^3$. A somewhat similar effect can be obtained by fixing, within the tail of the plane or helicopter, a solid metal rod or reflector 91 mounted in an insulating block 92 so as not to be grounded, as shown in dotted lines in Fig. 1. For planes having a tail or rudder structure, the antenna can be mounted so that such structure will serve this purpose equally as well as the rod 91. It will, of course, be apparent that such indexing means need not be set so that the indexing pip is normally coincident with graduation $r^3$ but in normal use this portion of the circular trace is not important for clearance or direction indicating purposes.

If desired pairs of suitably connected leads 92ª, 93, 94, and 95 respectively, may be brought out of the transformer output amplifier 52, and the high gain amplifier 51 to the range-switch 96 which may be mounted on the instrument panel 23 and provided with a suitable manipulable key 97. The transformer output amplifier 52 is conveniently arranged so that when the range switch 96 is in one position only strong signals from relatively short range can be imposed upon the defocusing anode 42 and correspondingly the output of the high gain amplifier 51 will be raised so that the visible portion of the horizontal trace as it appears on the screen-end 33 of the cathode ray tube 32 will represent a distance of only a few hundred yards. Consequently, the apparatus will have what may be termed short range and may be used for blind landings and take-offs. In addition, such short range may be used before take-off to check the accuracy of the apparatus by taking a "fix" upon nearby objects of known position and distance. By moving the key 97 to its other position, the apparatus can be returned to long range condition for normal flight operation.

It will, of course, be understood that modification may be made in the apparatus without departing from the spirit of our invention. For example, the azimuthal or direction-indicating trace need not be circular in shape but may be elliptical or diamond shaped and, in fact, we may even employ a lineal trace focused so as to be spaced from the distance-indicating trace for ease in reading, it being obvious that in such instances the accompanying scales or graduations must be appropriately arranged on the face of the screen-end of the cathode ray tube. Similarly, we may employ any high frequency radiation ranging from about 30 megacycles to 3000 megacycles or higher depending upon the desired range and the permissible limits of weight, size and cost within which the equipment is to be designed.

We claim:

1. An indicating device comprising a bi-conical horn type radiator for emitting radiant energy impulses which will reradiate to produce impulse echoes upon striking a remote object, a rotating antenna for receiving such impulse echoes, a cathode ray tube, having a screen and means for producing an electron beam, means for causing the beam to sweep first a circular trace and then a lineal trace in sufficiently rapid succession to take advantage of the persistence of human vision so as to give the visual appearance of two separate and continuous images of the traces on the screen, means for imposing received impulse echoes upon the tube to produce, on the circular trace a visible indication, which, by its position designates the direction of the object causing the impulse echo, and means for imposing received impulse echoes upon the tube to produce, on the lineal trace, a visible indication which designates the distance between the source and the obstacle causing the impulse echoes.

2. An indicating device comprising a bi-conical horn type radiator for emitting radiant energy impulses which will reradiate to produce impulse echoes upon striking a remote object, a rotatable antenna array consisting of a dipole with a corner reflector for receiving such impulse echoes, a cathode ray tube having a screen and means for producing an electron beam, a sine-wave oscillator for causing the beam to sweep a circular trace on the screen, means for rotating the antenna in timed relation to the rate at which the beam sweeps the circular trace, a saw-tooth oscillator for causing the beam to sweep a lineal trace, means for alternately imposing the sine-wave oscillator output and the saw-tooth oscillator output upon the beam in sufficiently rapid succession to take advantage of the persistence of human vision to produce a visual effect of simultaneous and continuous images of the circular and lineal traces on the screen, means for imposing received impulse echoes upon the tube to produce, on the circular trace, a visible indication, which, by its position, designates the direction of the object causing the impulse echo, and means for imposing received impulse echoes upon the tube to produce on the lineal trace, a visible indication which by its position, designates the distance between the source and the obstacle causing the impulse echoes.

3. An indicating device comprising a means including bi-conical horn type radiator for emitting radiant energy impulses which will upon striking a remote object reradiate to produce an impulse echo that returns along the azimuthal line between the radiator and such object, a rotatable antenna having a line of directional receptivity and being adapted to receive an impulse echo only when its line of directional receptivity is substantially aligned with the azimuthal line along which the impulse echo returns, a cathode ray tube, having a screen and means for producing an electron beam, a sine-wave oscillator for causing the beam to sweep a circular trace on the screen, a saw-tooth oscillator for causing the beam to sweep a lineal trace means for blanking out first one oscillator and then the other in sufficiently rapid succession to take advantage of the persistence of human vision so that both traces will appear on the screen as continuous images, means for rotating the antenna in timed relation to the rate of movement of the beam as it sweeps the circular trace, means for imposing received impulse echoes upon the tube to produce, on the circular trace, a visible indication, which, by its position, designates the direction of said azimuthal line, and means for imposing received impulse echoes upon the tube to produce, on the lineal trace, a visible indication which by its position designates the distance between the source and the obstacle causing the impulse echoes.

4. An indicating device comprising means including a bi-conical horn type radiator for emitting intermittent radiant energy pulses which will reradiate to produce impulse echoes upon striking a remote object, a rotatable antenna array consisting of a dipole with a corner reflector a receiver connected to the antenna, a cathode ray tube having a screen, defocusing anode and means for producing an electron beam, a sine-wave oscillator for causing the beam to sweep a circular trace on the screen, means for rotating the antenna in timed relation to the rate at which the beam sweeps the circular trace, a saw-tooth oscillator for causing the beam to sweep a lineal trace, an impulse selector including a plurality of blanking means for alternately imposing the sine-wave oscillator output and the saw-tooth oscillator output upon the beam in rapid succession to produce a visual effect of simultaneous and continuous circular and lineal traces on the screen, and switching means for imposing the receiver output upon the defocusing anode when the beam is sweeping the circular trace to produce a visible indication, which, by its position, designates the direction of the object causing the impulse echoes, said switching means being also adapted to superimpose the receiver output upon the saw-tooth oscillator when the beam is sweeping a lineal trace, to produce a visible deflection which by its position designates the distance between the source and the obstacle causing the impulse echoes.

5. An indicating device comprising means including a bi-conical horn type radiator for emitting radiant energy impulses which will, upon striking a remote object, reradiate to produce an impulse echo that returns along the azimuthal line between the radiator and such object, a rotatable antenna having a line of directional receptivity and being adapted to receive an impulse echo only when its line of directional receptivity is substantially aligned with the azimuthal line along which the impulse echo returns, a cathode ray tube having a screen and means for producing an electron beam, a sine-wave oscillator for causing the beam to sweep a circular trace on the screen, said screen being provided with an indexing mark adjacent to the circular trace, a saw-tooth oscillator for causing the beam to sweep a lineal trace means for blanking out first one oscillator and then the other in rapid succession so that both traces will continuously appear on the screen, means for rotating the antenna in timed relation to the rate of movement of the beam as it sweeps the circular trace, means for imposing received impulse echoes upon the tube to produce, on the circular trace, a visible indication, which, by its position, designates the direction of said azimuthal line, means for imposing received impulse echoes upon the tube to produce, on the lineal trace, a visible indication which by its position designates the distance between the source and the obstacle causing the impulse echoes, and means associated with the rotatable antenna for producing a visible indication on the circular trace in registration with the indexing mark so long as said timed relation is maintained.

6. An indicating device comprising means including a bi-conical horn type radiator for emitting radiant energy impulses which will, upon striking a remote object, reradiate to produce an impulse echo that returns along the azimuthal line between the radiator and such object, a rotatable antenna having a line of direction receptivity and being adapted to receive an impulse echo only when its line of directional receptivity is substantially aligned with the azimuthal line along which the impulse echo returns, a cathode ray tube having a screen and means for producing an electron beam, a sine-wave oscillator for causing the beam to sweep a circular trace on the screen, said screen being provided with an indexing mark adjacent to the circular trace, means for rotating the antenna in time relation to the rate of movement of the beam as it sweeps the circular trace, means for imposing received impulse echoes upon the tube to produce, on the circular trace, a visible indication, which, by its position, designates the direction of said azimuthal line, impulse producing means carried by the rotatable antenna, and means mounted in proximity to the impulse producing means, said means being adapted to receive an impulse from the impulse producing means as the latter passes over a predetermined position, said impulse being imposed upon the cathode ray tube for producing a visible indication on the circular trace in registration with the indexing mark so long as said timed relation is maintained.

7. An indicating device comprising a bi-conical horn type radiator for emitting radiant energy impulses which will reradiate to produce impulse echoes upon striking a remote object, a continuously rotating antenna for receiving such impulse echoes, a cathode ray tube having a screen and means for producing an electron beam, means for causing the beam to sweep first a circular trace and then a lineal trace in sufficiently rapid succession to take advantage of the persistence of human vision so as to give the visual appearance of two separate and continuous images of the traces on the screen, means for imposing received impulse echoes upon the tube to produce, on the circular trace a visible indication, which, by its position designates the direction of the object causing the impulse echo, and means for imposing received impulse echoes upon the tube to produce, on the lineal trace, a visible indication which designates the distance between the source and the obstacle causing the impulse echoes.

LEONARD B. LIPSON.
ALFRED W. PETCHAFT.

REFERENCES CITED

The following references are of record in the file of this patent:

UNITED STATES PATENTS

| Number | Name | Date |
|---|---|---|
| 2,151,917 | Hyland | Mar. 28, 1939 |
| 2,175,252 | Carter | Oct. 10, 1939 |
| 2,189,549 | Hershberger | Feb. 6, 1940 |
| 2,216,950 | Kummich | Oct. 8, 1940 |
| 2,272,607 | Higonnet | Feb. 10, 1942 |
| 2,283,935 | King | May 26, 1942 |
| 2,312,761 | Hershberger | Mar. 2, 1943 |
| 2,405,231 | Newhouse | Aug. 6, 1946 |
| 2,409,462 | Zworyking | Oct. 15, 1946 |
| 2,412,702 | Wolff | Dec. 17, 1946 |
| 2,419,205 | Feldman | Apr. 22, 1947 |
| 2,419,567 | Labin | Apr. 29, 1947 |
| 2,422,361 | Miller | June 7, 1947 |
| 2,430,292 | Hershberger | Nov. 4, 1947 |
| 2,449,976 | Busignies | Sept. 28, 1948 |
| 2,468,032 | Busignies | Apr. 26, 1949 |

FOREIGN PATENTS

| Number | Country | Date |
|---|---|---|
| 497,147 | Great Britain | Dec. 9, 1938 |
| 542,634 | Great Britain | Jan. 21, 1942 |